(12) United States Patent
Song et al.

(10) Patent No.: US 9,880,421 B2
(45) Date of Patent: Jan. 30, 2018

(54) CURVED LIQUID CRYSTAL DISPLAY

(71) Applicant: Samsung Display Co., Ltd., Yongin-si (KR)

(72) Inventors: Dong Han Song, Hwaseong-si (KR); Oh Jeong Kwon, Hwaseong-si (KR); Su Jin Kim, Seoul (KR); Jin Won Kim, Suwon-si (KR); Ki Chul Shin, Seongnam-si (KR); Dong Chul Shin, Seoul (KR); Sung Jae Yun, Hwaseong-si (KR); Hyeok Jin Lee, Seongnam-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 22 days.

(21) Appl. No.: 14/863,061

(22) Filed: Sep. 23, 2015

(65) Prior Publication Data
US 2016/0170268 A1    Jun. 16, 2016

(30) Foreign Application Priority Data

Dec. 10, 2014  (KR) .................... 10-2014-0177437
Mar. 25, 2015  (KR) .................... 10-2015-0041480

(51) Int. Cl.
*G02F 1/1337* (2006.01)
*G02F 1/1333* (2006.01)
*G02F 1/1343* (2006.01)

(52) U.S. Cl.
CPC .. *G02F 1/133707* (2013.01); *G02F 1/133723* (2013.01); *G02F 2001/133337* (2013.01);
(Continued)

(58) Field of Classification Search
CPC ... G02F 1/133707; G02F 2001/133337; G02F 2001/133397; G02F 2001/133773;
(Continued)

(56) References Cited

U.S. PATENT DOCUMENTS 8,304,309 B2   11/2012  Oh et al.
8,793,858 B2    8/2014  Kim
(Continued)

FOREIGN PATENT DOCUMENTS

KR   10-2010-0112525   10/2010
KR   10-2011-0066036    6/2011
(Continued)

*Primary Examiner* — Nathanael R Briggs
(74) *Attorney, Agent, or Firm* — H.C. Park & Associates, PLC

(57) ABSTRACT

A curved liquid crystal display is provided. The curved liquid crystal display includes: a first curved substrate; a second curved substrate; a liquid crystal layer including liquid crystal molecules having negative dielectric anisotropy, the liquid crystal layer being interposed between the first and second curved substrates; a first curved liquid crystal alignment layer interposed between the liquid crystal layer and the first curved substrate; and a second curved liquid crystal alignment layer interposed between the liquid crystal layer and the second curved substrate. The first curved liquid crystal alignment layer includes protrusions protruded toward the second curved liquid crystal alignment layer. The second curved liquid crystal alignment layer includes protrusions protruded toward the first curved liquid crystal alignment layer. An average number of the protrusions on the second curved liquid crystal alignment layer is greater than an average number of protrusions on the first curved liquid crystal alignment layer.

10 Claims, 20 Drawing Sheets

(52) U.S. Cl.
CPC ............ *G02F 2001/133397* (2013.01); *G02F 2001/133773* (2013.01); *G02F 2001/134345* (2013.01)

(58) Field of Classification Search
CPC ... G02F 2001/134345; G02F 1/133305; G02F 2001/133302
See application file for complete search history.

(56) References Cited

U.S. PATENT DOCUMENTS

| | | | |
|---|---|---|---|
| 2010/0283953 A1* | 11/2010 | Sasaki | G02F 1/133707 349/128 |
| 2011/0025588 A1* | 2/2011 | Ma | G02F 1/133555 345/87 |
| 2011/0228190 A1* | 9/2011 | Yang | G02F 1/13394 349/56 |
| 2012/0021142 A1 | 1/2012 | Lee et al. | |
| 2015/0009442 A1 | 1/2015 | Lee et al. | |
| 2015/0009465 A1 | 1/2015 | Park et al. | |
| 2015/0029455 A1 | 1/2015 | Kim et al. | |

FOREIGN PATENT DOCUMENTS

| | | |
|---|---|---|
| KR | 10-2011-0117439 | 10/2011 |
| KR | 10-2013-0059758 | 6/2013 |
| KR | 10-2015-0004140 | 1/2015 |
| KR | 10-2015-0005000 | 1/2015 |
| KR | 10-2015-0012093 | 2/2015 |

\* cited by examiner

CURVED LIQUID CRYSTAL DISPLAY

CROSS-REFERENCE TO RELATED APPLICATIONS

This application claims priority from and the benefit of Korean Patent Application No. 10-2014-0177437, filed on Dec. 10, 2014, and Korean Patent Application No. 10-2015-0041480, filed on Mar. 25, 2015, which are hereby incorporated by reference for all purposes as if fully set forth herein.

BACKGROUND

Field

Exemplary embodiments relate to a curved liquid crystal display.

Discussion of the Background

Liquid crystal displays (LCDs) are one of the most widely adopted types of flat panel displays. Generally, an LCD includes a pair of display panels having electric field generating electrodes, such as pixel electrodes and a common electrode, and a liquid crystal layer interposed between the display panels.

The LCD generates an electric field in the liquid crystal layer by applying voltages to the electric field generating electrodes. Accordingly, the alignment of liquid crystals of the liquid crystal layer is determined based on the generated electric field, and polarization of incident light is controlled by the alignment of liquid crystals. As a result, an image is displayed on the LCD display.

As LCDs are used as displays for television receivers, their screens are becoming larger in size. As the size of the LCDs increases, a viewing angle may greatly differ depending on whether a viewer watches the central part of the screen or both ends of the screen.

In order to compensate for this viewing angle difference, LCDs may be curved (concave or convex). From the perspective of a viewer, LCDs may be classified into portrait-type LCDs whose vertical length is longer than their horizontal length and are curved in a vertical direction, and landscape-type LCDs whose vertical length is shorter than their horizontal length and are curved in a horizontal direction.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a curved liquid crystal display having improved light transmittance.

Additional aspects will be set forth in the detailed description which follows, and, in part, will be apparent from the disclosure, or may be learned by practice of the inventive concept.

An exemplary embodiment discloses a curved liquid crystal display including: a first curved substrate; a second curved substrate; a liquid crystal layer including liquid crystal molecules having negative dielectric anisotropy, the liquid crystal layer being interposed between the first curved substrate and the second curved substrate; a first curved liquid crystal alignment layer interposed between the liquid crystal layer and the first curved substrate; and a second curved liquid crystal alignment layer interposed between the liquid crystal layer and the second curved substrate. The first curved liquid crystal alignment layer includes protrusions protruded toward the second curved liquid crystal alignment layer. The second curved liquid crystal alignment layer includes protrusions protruded toward the first curved liquid crystal alignment layer. An average number of the protrusions on the second curved liquid crystal alignment layer is greater than an average number of protrusions on the first curved liquid crystal alignment layer.

An exemplary embodiment also discloses a curved liquid crystal display including: a first curved substrate; a second curved substrate; a liquid crystal layer including liquid crystal molecules having negative dielectric anisotropy, the liquid crystal layer being interposed between the first curved substrate and the second curved substrate; a first curved liquid crystal alignment layer interposed between the liquid crystal layer and the first curved substrate; and a second curved liquid crystal alignment layer which has an average value of surface roughness values greater than an average value of surface roughness values of the first curved liquid crystal alignment layer, the second curved liquid crystal alignment layer being interposed between the liquid crystal layer and the second curved substrate.

An exemplary embodiment further discloses a curved liquid crystal display including: a first curved substrate; a second curved substrate; a first curved liquid crystal alignment layer interposed between the first curved substrate and the second curved substrate; a second curved liquid crystal alignment layer interposed between the first curved liquid crystal alignment layer and the second curved substrate; and a liquid crystal layer including a first liquid crystal molecule and a second liquid crystal molecule, the first liquid crystal molecule having negative dielectric anisotropy and aligned on a surface of the first curved liquid crystal alignment layer, the second liquid crystal molecule having negative dielectric anisotropy and aligned on a surface of the second curved liquid crystal alignment layer, the second liquid crystal molecule having a pre-tilt angle less than a pre-tilt angle of the first liquid crystal molecule in a state where no electric field is applied to the liquid crystal layer. The liquid crystal layer is interposed between the first curved liquid crystal alignment layer and the second curved liquid crystal alignment layer.

An exemplary embodiment also discloses a curved liquid crystal display including: a first curved substrate; a second curved substrate; a liquid crystal layer including liquid crystal molecules, the liquid crystal layer being interposed between the first curved substrate and the second curved substrate; a first curved liquid crystal alignment layer interposed between the liquid crystal layer and the first curved substrate; and a second curved liquid crystal alignment layer interposed between the liquid crystal layer and the second curved substrate, the second curved liquid crystal alignment layer including a stabilizer configured to stabilize an alignment direction of a liquid crystal molecule located within a distance from the second curved liquid crystal alignment layer.

One or more exemplary embodiments provides a curved liquid crystal display having improved light transmittance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
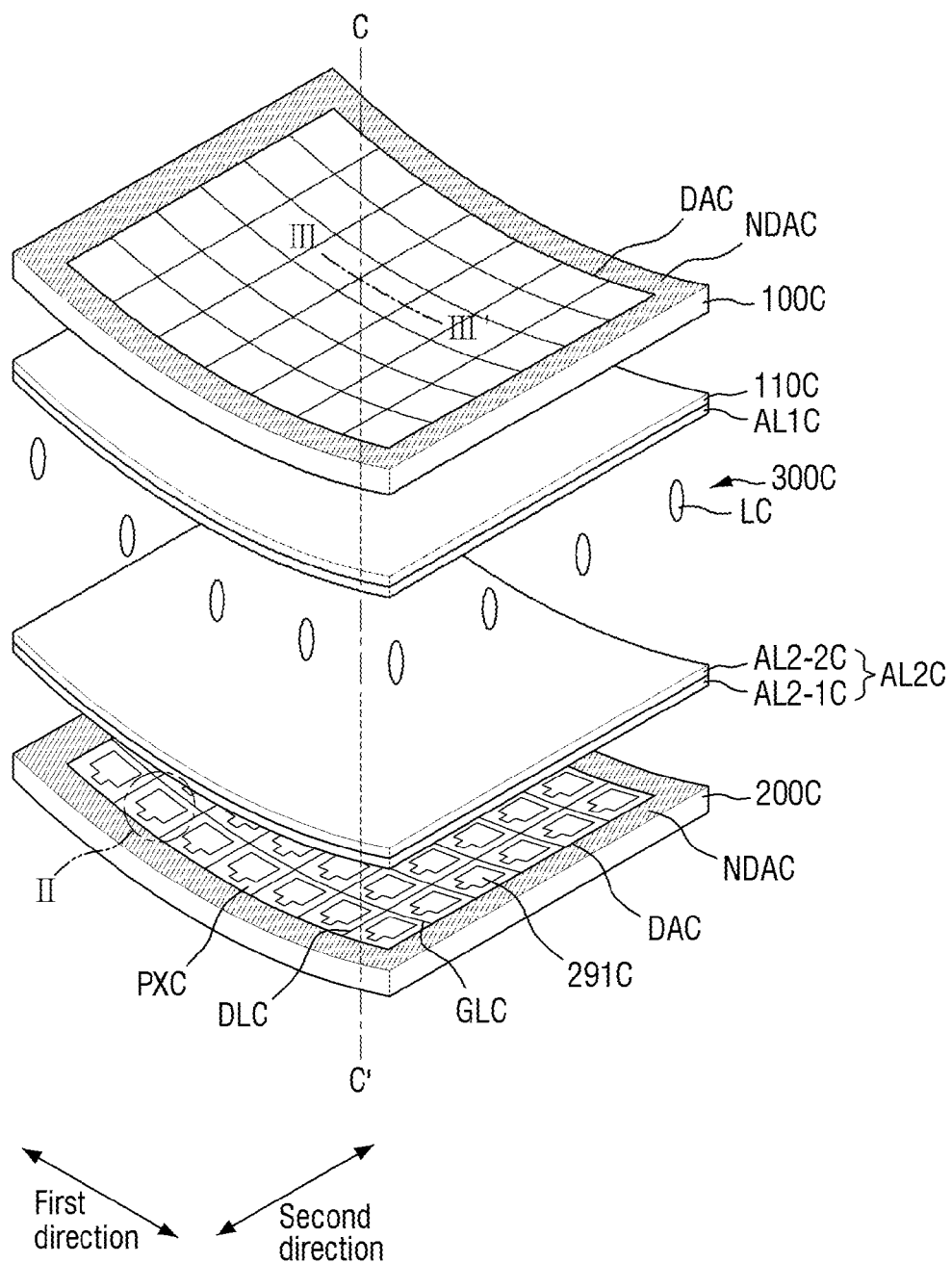
FIG. 1 is a schematic exploded perspective diagram of a curved liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of "X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the drawings.

Figure 2:
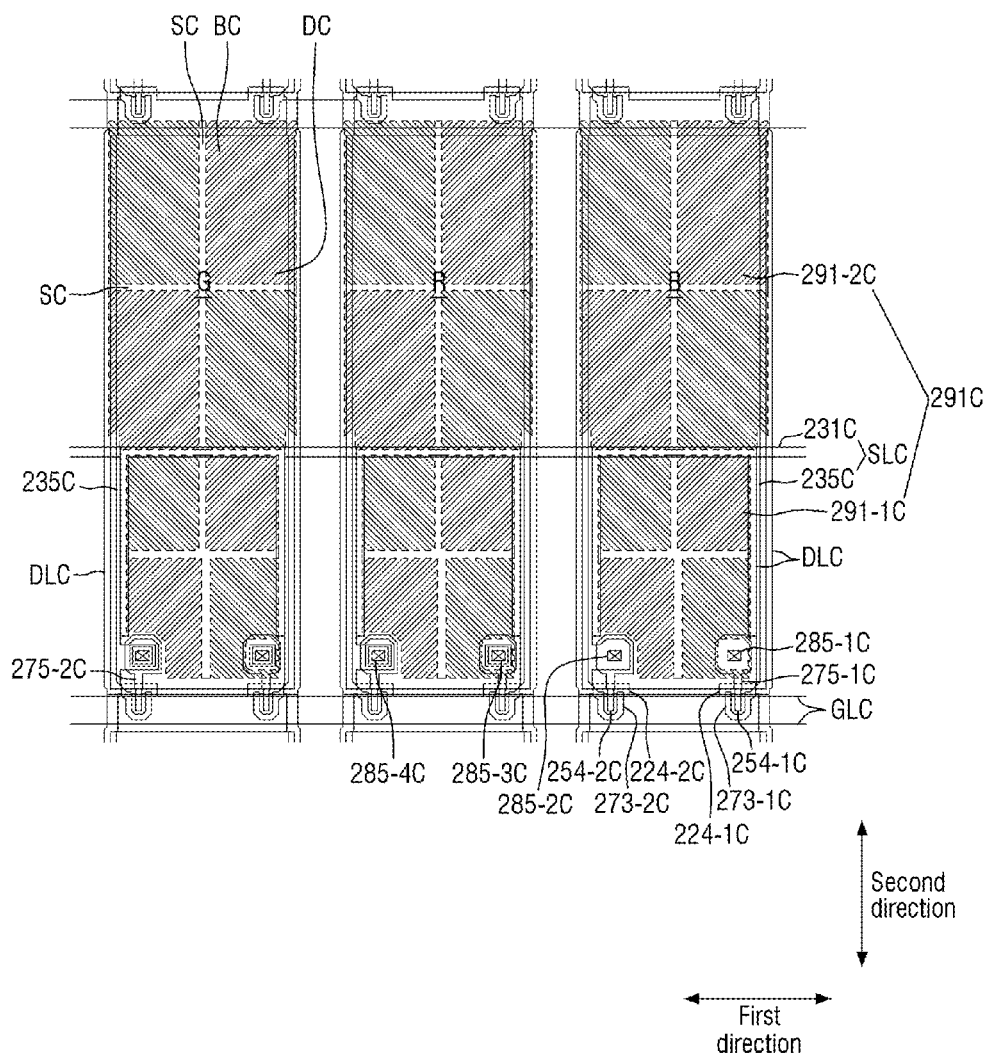
FIG. 2 is a schematic enlarged view of region II of FIG. 1.

FIG. 1 is a schematic exploded perspective diagram of a curved liquid crystal display according to an exemplary embodiment. FIG. 2 is a schematic enlarged view of region II of FIG. 1.

Referring to FIG. 1 and FIG. 2, the curved liquid crystal display 500C according to an exemplary embodiment includes a first curved substrate 100C, a second curved substrate 200C spaced apart from the first curved substrate 100C and facing the first curved substrate 100C, and a liquid crystal layer 300C interposed between the first curved substrate 100C and the second curved substrate 200C.

Each of the first curved substrate 100C and the second curved substrate 200C includes a display region DAC and a non-display region NDAC. The display region DAC is a region where an image is displayed and the non-display region NDAC is a region where an image is not displayed. A perimeter of the display region DAC may be surrounded by the non-display region NDAC.

A common electrode 110C may be interposed between the first curved substrate 100C and the second curved substrate 200C, and may be a patternless electrode having no slit pattern. A pixel electrode 291C may be interposed between the second curved substrate 200C and the common electrode 110C, and may be a patterned electrode having a slit pattern.

The liquid crystal layer 300C may be interposed between the common electrode 110C and the pixel electrode 291C. The liquid crystal layer 300C may include liquid crystal molecules (LC) having negative dielectric anisotropy, but aspects are not limited as such. A first curved liquid crystal alignment layer AL1C may be interposed between the common electrode 110C and the liquid crystal layer 300C. A second curved liquid crystal alignment layer AL2C may be interposed between the pixel electrode 291C and the liquid crystal layer 300C.

The second curved substrate 200C may be a thin film transistor substrate. A plurality of gate lines GLC extending in a first direction and a plurality of data lines DLC extending in a second direction perpendicular to the first direction may be formed in the display region DAC of the second curved substrate 200C. A pixel electrode 291C may be arranged in each pixel PXC, each defined by two of the gate lines GLC and two of the data lines DLC, respectively.

The pixel electrode 291C may include subpixel electrodes 291-1C and 291-2C spaced apart from each other. For example, each of the subpixel electrodes 291-1C and 291-2C may have a tetragonal shape overall. Each of the subpixel electrodes 291-1C and 291-2C may be a patterned electrode having a slit pattern. Specifically, the slit pattern may include a stem part SC and a plurality of branch parts BC. The slit pattern may include a plurality of cut parts DC interposed between two adjacent branch parts BC extending from the stem part SC. The stem part SC may be formed to have a cross (+) shape, and the branch part BC may extend radially from the cross (+)-shaped stem part SC in an approximately 45° direction.

The gate lines GLC may include gate electrodes 224-1C and 224-2C protruded in the second direction from the gate lines GLC toward the pixel electrode 291C. The plurality of data lines DLC may include source electrodes 273-1C and 273-2C and drain electrodes 275-1C and 275-2C. The source electrodes 273-1C and 273-2C may be protruded from the data lines DLC and formed into a "U" shape. The drain electrodes 275-1C and 275-2C may be spaced apart from the source electrodes 273-1C and 273-2C.

The pixel electrode 291C may be provided with a data voltage through a thin film transistor serving as a switching element. The gate electrodes 224-1C and 224-2C serving as a control terminal of the thin film transistor may be electrically connected to the gate lines GLC, the source electrodes 273-1C and 273-2C serving as an input terminal may be electrically connected to the data lines DLC via contact holes 285-1C, 285-2C, 285-3C and 285-4C, and the drain electrodes 275-1C and 275-2C serving as an output terminal may be electrically connected to the pixel electrodes 291C.

The pixel electrode 291C may cooperate with the common electrode 110C to generate an electric field and control the alignment direction of the liquid crystal molecules LC of the liquid crystal layer 300C interposed between the pixel electrode 291C and the common electrode 110C. The pixel electrode 291C may distort the electric field to control the alignment direction of first liquid crystal molecules LC1 and second liquid crystal molecules LC2-1 and LC2-2 (see FIG. 3).

The thin film transistor substrate may include a structure in which a base substrate (not shown), gate electrodes 224-1C and 224-2C, a gate insulation layer (not shown), a semiconductor layer (not shown), an ohmic contact layer (not shown), source electrodes 273-1C and 273-2C, drain electrodes 275-1C and 275-2C, a passivation layer (not shown), an organic layer (not shown) and the like are stacked. The base substrate may include at least one of glass and polymer or may be made of glass or polymer.

A channel of the thin film transistor may be formed in a certain region of a semiconductor layer (not shown). The semiconductor layer (not shown) may be arranged to be overlapped with the gate electrodes 224-1C and 224-2C. Separate semiconductor layers may be arranged on the gate electrodes 224-1C and 224-2C, respectively. The source electrodes 273-1C and the drain electrodes 275-1C may be spaced apart from each other with respect to the semiconductor layer overlapped with the gate electrode 224-1C and form a channel in the semiconductor conductor layer disposed between the source electrodes 273-1C and the drain electrodes 275-1C. The source electrodes 273-2C and the drain electrodes 275-2C may also be spaced apart from each other with respect to the semiconductor layer overlapped with the gate electrode 224-2C and form a channel in the semiconductor layer disposed between the source electrodes 273-2C and the drain electrodes 275-2C.

A sustain electrode line (SLC) may include a stem line 231C arranged substantially in parallel with the plurality of gate lines GLC and a plurality of branch lines 235C extending from the stem line 231C. The sustain electrode line SLC may be omitted, and may have a shape and an arrangement which can be variously modified.

The non-display region NDAC may be a peripheral part of the display region DAC and may be a light blocking region surrounding the display region DAC. A driving unit (not shown) which provides a gate driving signal, a data driving signal and the like to each pixel PXC of the display region DAC may be disposed in the non-display region NDAC of the second curved substrate 200C. The gate lines GLC and the data lines DLC may extend from the display region DAC to the non-display region NDAC and may be electrically connected to the driving unit (not shown).

The first curved substrate 100C may face the second curved substrate 200C. The common electrode 110C may be disposed on the second curved substrate 200C.

A color filter layer (not shown) may be formed in a region corresponding to each pixel PXC in the display region DAC, and may include a red color filter R, a green color filter G, and a blue color filter B. The color filter layer (not shown) may be included in either the first curved substrate 100C or the second curved substrate 200C. For example, if the first curved substrate 100C includes the color filter layer (not shown), the first curved substrate 100C may have a structure in which a base substrate (not shown), the color filter layer (not shown) and an overcoat layer (not shown) are stacked. The overcoat layer (not shown) may be a planarization layer covering the color filter layer (not shown). In this case, the common electrode 110C may be disposed on the overcoat layer (not shown). The base substrate may include at least one of glass and polymer or may be made of glass or polymer.

If the second curved substrate 200C includes the color filter layer (not shown), the second curved substrate 200C may have a color filter on array (COA) structure in which a color filter is formed on a transparent insulation substrate on which a thin film transistor is formed. For example, the color filter layer (not shown) may be interposed between an organic layer (not shown) and a passivation layer (not shown) covering the source electrodes 273-1C and 273-2C and the drain electrodes 275-1C and 275-2C.

A light blocking pattern layer (not shown) may be disposed at boundaries among the color filters R, G and B. The light blocking pattern layer (not shown) may be included in either the first curved substrate 100C or the second curved substrate 200C. For example, the light blocking pattern layer (not shown) may be a black matrix.

A misalignment may occur between the first curved substrate 100C and the second curved substrate 200C due to the stress being applied to at least one of a first flat substrate and a second flat substrate in the process of bending a flat liquid crystal display during a fabrication of the curved liquid crystal display 500C. For example, in the process of bending a flat liquid crystal display, the first curved substrate 100C may shift to the left or right side with respect to the second curved substrate 200C. In this case, an alignment between the first curved substrate 100C and the second curved substrate 200C may differ from a pre-designed arrangement between the first flat substrate and the second flat substrate. Such a misalignment between the first curved substrate 100C and the second curved substrate 200C may cause degradation in display quality of the curved liquid crystal display 500C.

For example, if each of the first curved liquid crystal alignment layer AL1C and the second curved liquid crystal alignment layer AL2C includes a plurality of domains in which alignment directions of directors of liquid crystal molecules are different from each other, misalignment between a boundary between domains of first curved liquid crystal alignment layer AL1C and a boundary between domains of the second curved liquid crystal alignment layer AL2C may cause interference or collision of alignment directions of the first liquid crystal molecules tilt-aligned on a surface of the first curved liquid crystal alignment layer AL1C and the second liquid crystal molecules tilt-aligned on a surface of the second curved liquid crystal alignment layer AL2C in the direction different from the direction of the first liquid crystal molecules, with the result of a substantially vertical alignment of liquid crystal molecules between the first liquid crystal molecules and second liquid crystal molecules, thereby forming a texture. The texture may be seen as a spot defect or a dark portion in the display region DAC of the curved liquid crystal display 500C, and may cause degradation of light transmittance in the curved liquid crystal display 500C.

Figure 3:
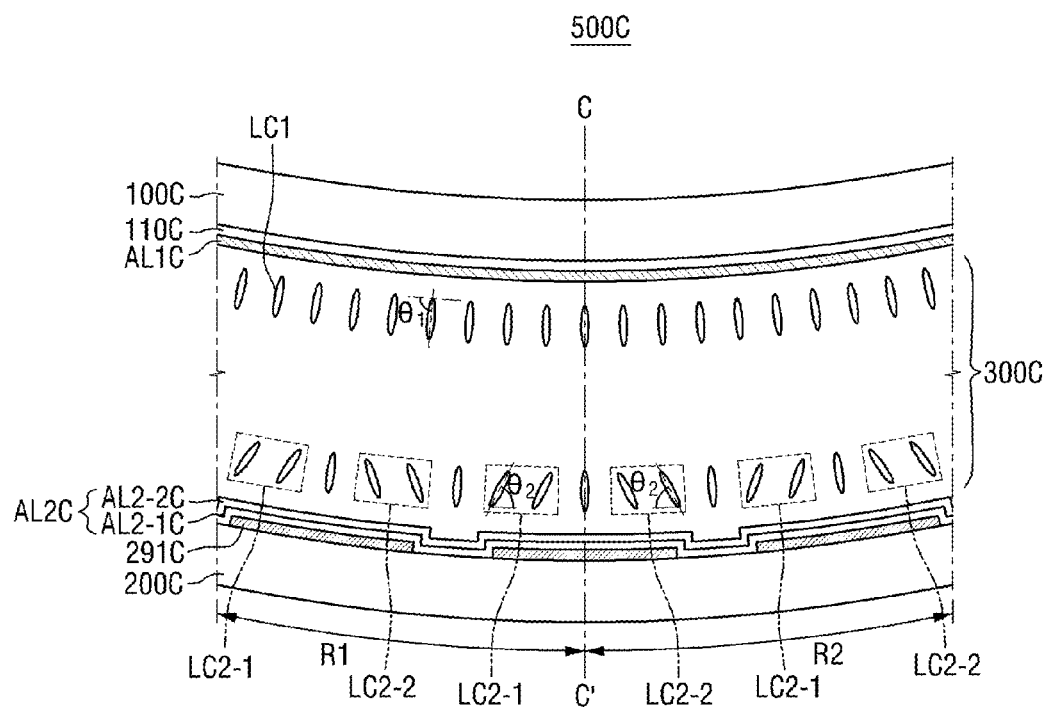
FIG. 3 is a schematic cross-sectional view taken along section line III-III' of FIG.

The curved liquid crystal display 500C according to an exemplary embodiment will be described in more detail with reference to FIG. 3. FIG. 3 is a schematic cross-sectional view taken along line III-III' of FIG. 1. FIG. 3 schematically illustrates an alignment of liquid crystal molecules LC1, LC2-1, and LC2-2 in an early state where no electric field is applied to the curved liquid crystal display 500C.

Referring to FIG. 3, the first liquid crystal molecules LC1 may be aligned on the surface of the first curved liquid crystal alignment layer AL1C. The second liquid crystal molecules LC2-1 and LC2-2 may be aligned on the surface of the second curved liquid crystal alignment layer AL2C. The first liquid crystal molecules LC1 having a first pre-tilt angle $\theta_1$ may be relatively vertically aligned as compared with the second liquid crystal molecules LC2-1 and LC2-2. The second liquid crystal molecules LC2-1 and LC2-2 having a second pre-tilt angle $\theta_2$ may be relatively tilt-aligned as compared with the first liquid crystal molecules LC1. The first pre-tilt angle $\theta_1$ is larger than the second pre-tilt angle $\theta_2$ in the early state where no electric field is applied to the curved liquid crystal display 500C.

For example, the curved liquid crystal display 500C according to an exemplary embodiment may have a radius of curvature R ranging from 2,000 mm to 5,000 mm, and a difference ($m\theta_1 - m\theta_2$) between an average value ($m\theta_1$) of the first pre-tilt angle $\theta_1$ and an average value ($m\theta_2$) of the second pre-tilt angle $\theta_2$ may be 0.5° to 1.5° in the early state where no electric field is applied to the curved liquid crystal display 500C. When the radius of curvature R of the curved liquid crystal display 500C ranges from 2,000 mm to 5,000 mm, and when the difference ($m\theta_1 - m\theta_2$) between the average value ($m\theta_1$) of the first pre-tilt angle $\theta_1$ and the average value ($m\theta_2$) of the second pre-tilt angle $\theta_2$ ranges from 0.5° to 1.5°, the dark portion or spot defect caused due to a collision of the alignment directions of the first liquid crystal molecules LC1 and the second liquid crystal molecules LC2-1 and LC2-2 may be enhanced.

In an example, in the early state where no electric field is applied to the curved liquid crystal display 500C, the second curved liquid crystal alignment layer AL2C may form at least two domains in which the alignment directions of the second liquid crystal molecules LC2-1 and LC2-2 are different from each other in each of a first region R1 and a second region R2, and the first curved liquid crystal alignment layer AL1C may form one domain in which the alignment directions of the first liquid crystal molecules LC1 are substantially the same in each of the first region R1 and the second region R2.

The first region R1 and the second region R2 refer to the left region and the right region, respectively, about a virtual straight line C-C' which passes the apex of the first curved substrate 100C and the apex of the second curved substrate 200C. The apex is a certain point on a curve, e.g., the vertex of a parabola-shaped curved display, where the slope of a tangent at the point is substantially zero.

Referring to FIG. 3, 2-1th liquid crystal molecules LC2-1 may be aligned in a first tilt direction and 2-2th liquid crystal molecules LC2-2 may be aligned in a second tilt direction on the second curved liquid crystal alignment layer AL2C in the first region R1. The second curved liquid crystal alignment layer AL2C may form at least two domains in which the alignment direction of the 2-1th liquid crystal molecules LC2-1 and the alignment direction of the 2-2th liquid crystal molecules LC2-2 are different from each other in the first region R1. The first tilt direction may be in an approximately −α° direction with respect to the virtual straight line C-C' and the second tilt direction may be in an approximately +α° direction with respect to the virtual straight line C-C', where a is a positive real number.

The 2-1th liquid crystal molecules LC2-1 may be aligned in the first tilt direction and the 2-2th liquid crystal molecules LC2-2 may be aligned in the second tilt direction on the second curved liquid crystal alignment layer AL2C in the second region R2. The second curved liquid crystal alignment layer AL2C may form at least two domains in which the alignment direction of the 2-1th liquid crystal molecules LC2-1 and the alignment direction of the 2-2th liquid crystal molecules LC2-2 are different from each other in the second region R2.

Unlike the second curved liquid crystal alignment layer AL2C, the first curved liquid crystal alignment layer AL1C may form one domain in which the first liquid crystal molecules LC1 are aligned in a third tilt direction in the first region R1, and may form one domain in which the first liquid crystal molecules LC1 are aligned in a fourth tilt direction in the second region R2. For example, the third tilt direction may be in an approximately −β° direction about the virtual straight line C-C' and the fourth tilt direction may be in an approximately +β° direction about the virtual straight line C-C', where β is a positive real number.

As described above, a plurality of domains in which the alignment directions of the liquid crystal molecules are different from each other are formed selectively only in the second curved liquid crystal alignment layer AL2C from among the first curved liquid crystal alignment layer AL1C and the second curved liquid crystal alignment layer AL2C in each of the first region R1 and the second region R2, thereby suppressing the occurrence of a spot defect or a dark portion caused due to a collision of the alignment directions of the first liquid crystal molecules LC1 and the second liquid crystal molecules LC2-1 and LC2-2.

Figure 4:
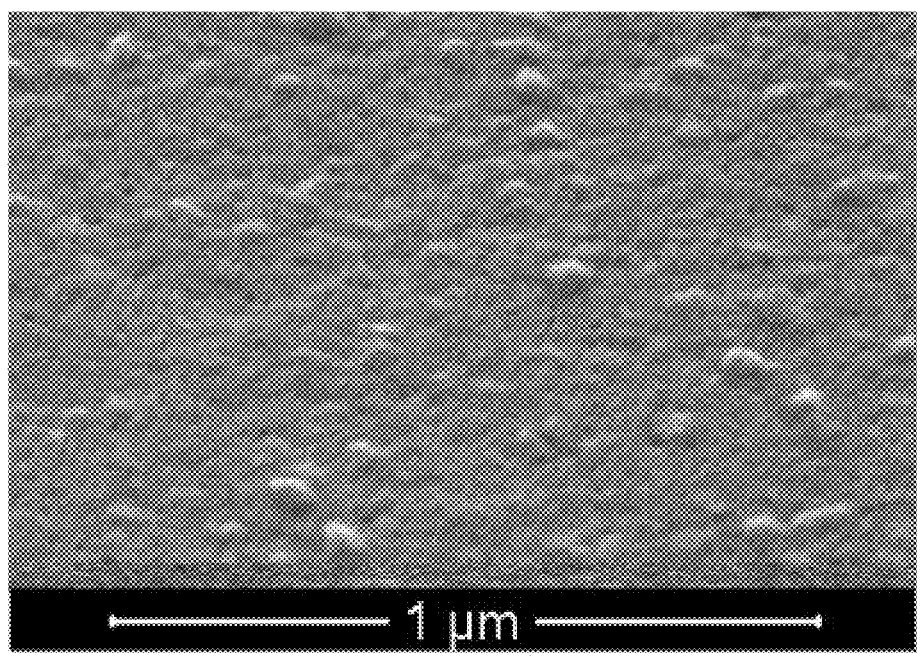
FIG. 4 is an image of a surface of a first curved liquid crystal alignment layer of FIG. 3.
Figure 5:
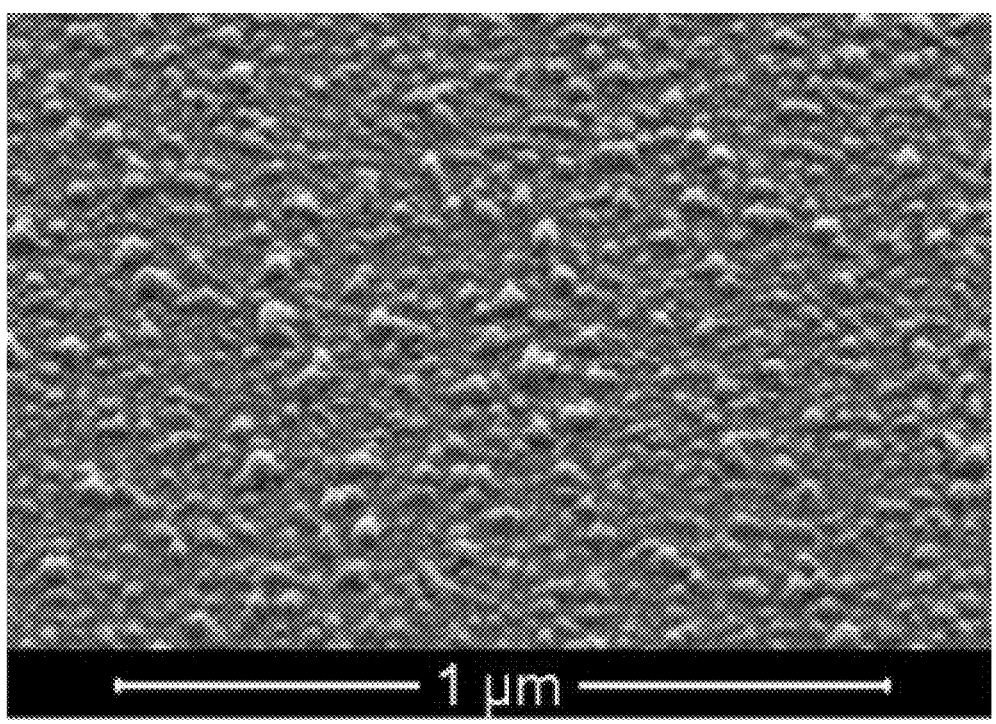
FIG. 5 is an image of a surface of a second curved liquid crystal alignment layer of FIG. 3.

Surfaces of the first curved liquid crystal alignment layer AL1C and the second curved liquid crystal alignment layer AL2C will be described in more detail with reference to FIG. 4 to FIG. 7. FIG. 4 is an image of a surface of the first curved liquid crystal alignment layer AL1C of FIG. 3. FIG. 5 is an image of a surface of the second curved liquid crystal alignment layer AL2C of FIG. 3.

Referring to FIG. 4 and FIG. 5, the average number of the protrusions protruded from one side of the second curved liquid crystal alignment layer AL2C may be larger than the average number of the protrusions protruded from one side of the first curved liquid crystal alignment layer AL1C. The protrusions may result from a light polymerization reaction of reactive mesogen in various sizes. Surface roughness values of the first and the second curved liquid crystal alignment layer may be different depending on degree of formation of the protrusions. The protrusions on the second curved liquid crystal alignment layer AL2C are denser than the protrusions on the first curved liquid crystal alignment layer AL1C. The one side of the first curved liquid crystal alignment layer AL1C is the side facing the second curved liquid crystal alignment layer AL2C. The one side of the second curved liquid crystal alignment layer AL2C is the side facing the first curved liquid crystal alignment layer AL1C. The protrusions are protruded from the one side of the second curved liquid crystal alignment layer AL2C. The protrusions may be arranged in an island pattern in which at least two protrusions are spaced apart from each other with a predetermined distance therebetween. Since the second liquid crystal molecules LC2-1 and LC2-2 fix or stabilize a director in a relatively tilt-aligned state as compared with the first liquid crystal molecules LC1, the protrusions of the second curved liquid crystal alignment layer AL2C may provide a relatively smaller pre-tilt angle to the second liquid crystal molecules LC2-1 and LC2-2 than the pre-tilt angle provided by the protrusions of the first curved liquid crystal alignment layer AL1C to the first liquid crystal molecules LC1.

Figure 6:
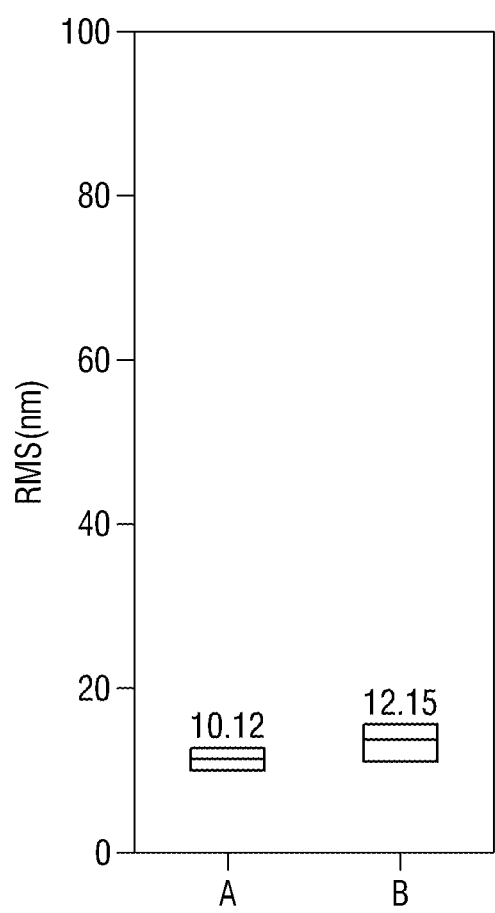
FIG. 6 is an analytical graphical representation of an average value of surface roughness values of the first curved liquid crystal alignment layer of FIG. 3.
Figure 7:
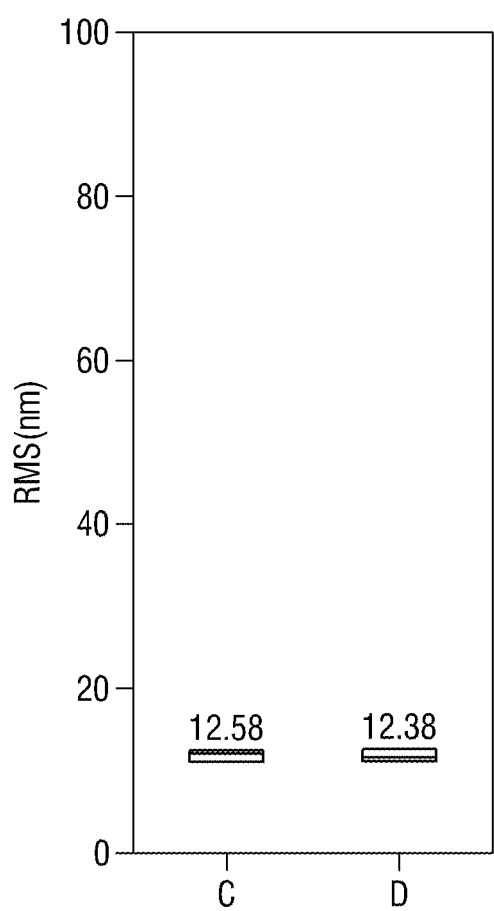
FIG. 7 is an analytical graphical representation of an average value of surface roughness values of the second curved liquid crystal alignment layer of FIG. 3.

FIG. 6 is an analytical graphical representation of an average value of surface roughness values of the first curved liquid crystal alignment layer AL1C of FIG. 3. FIG. 7 is an analytical graphical representation of an average value of surface roughness values of the second curved liquid crystal alignment layer AL2C of FIG. 3.

Referring to FIG. 6 and FIG. 7, the average value of surface roughness values of the first curved liquid crystal alignment layer AL1C is relatively smaller than the average value of the second curved liquid crystal alignment layer AL2C. Specifically, the average value of surface roughness values of the first curved liquid crystal alignment layer AL1C is measured as 10.12 nm (A) and 12.15 nm (B), and the average value of surface roughness values of the second curved liquid crystal alignment layer AL2C is measured as 12.58 nm (C) and 12.38 nm (D). The average value of surface roughness values is measured several times by varying the point of measurement and has a deviation according to the measurement point, however, the average value of surface roughness values of the first curved liquid crystal alignment layer AL1C is relatively smaller than the average value of the second curved liquid crystal alignment layer AL2C. It is expected from the measurement result of the average value of surface roughness values that each of the first curved liquid crystal alignment layer AL1C and the second curved liquid crystal alignment layer AL2C may have an average value of surface roughness values approximately less than 15 nm.

The first curved liquid crystal alignment layer AL1C may have a relatively lower content of polymerized reactive mesogen than that in the second curved liquid crystal alignment layer AL2C. Furthermore, the first curved liquid crystal alignment layer AL1C may have a relatively lower content of polymerization initiator than that in the second curved liquid crystal alignment layer AL2C.

For example, the first curved liquid crystal alignment layer AL1C may be a vertical alignment type liquid crystal alignment layer containing polyimides in which an imide group (—CONHCO—) is contained in a repeating group of a main chain and at least one vertical aligner from among an alkyl group, a hydrocarbon derivative having a terminal replaced with an alkyl group, a hydrocarbon derivative having a terminal replaced with a cycloalkyl group and a hydrocarbon derivative having a terminal replaced with aromatic hydrocarbons is introduced to a side chain. The first curved liquid crystal alignment layer AL1C differs from the second curved liquid crystal alignment layer AL2C in that the polymerization initiator is not introduced to a side chain of polyimides.

The second curved liquid crystal alignment layer AL2C may have a multi-layer structure including a 2-1th curved liquid crystal alignment layer AL2-1C and a 2-2th curved liquid crystal alignment layer AL2-2C. The 2-2th curved liquid crystal alignment layer AL2-2C may include protrusions protruded from a surface of the 2-1th curved liquid crystal alignment layer AL2-1C, and the protrusions may be arranged in an island pattern in which at least two protrusions are spaced apart from each other with a predetermined distance therebetween.

For example, the 2-1th curved liquid crystal alignment layer AL2-1C may be a vertical alignment type liquid crystal alignment layer containing polyimides in which an imide group (—CONHCO—) is contained in a repeating group of a main chain and the vertical aligner and a polymerization initiator are introduced to a side chain. The 2-2th curved liquid crystal alignment layer AL2-2C may be a polymer of reactive mesogens.

The 2-1th curved liquid crystal alignment layer AL2-1C may have a greater content of imide group than that in the 2-2th curved liquid crystal alignment layer AL2-2C, and the 2-2th curved liquid crystal alignment layer AL2-2C may have a greater content of polymerized reactive mesogen than that in the 2-1th curved liquid crystal alignment layer AL2-1C.

For example, the polymerization initiator may be one or more of acetophenone, benzoin, benzophenone, diethoxy acetophenone, phenyletone, thioxanthone, 2-hydroxy-2-methyl-1-phenylpropane-1-on, benzyl dimethyl tar, 4-(2-hydroxy ethoxy)phenyl-(2-hydroxy)-2-propyl ketone, 1-hydroxycyclohexylphenyl ketone, o-benzoyl methyl benzoate, 4-pheny benzophenone, 4-benzoyl-4'-methyl-diphenyl sulfide, (4-benzoyl benzyl)trimethylammonium chloride, bis(2,4,6-trimethylbenzoyl)-phenyl phosphine oxide, diphenyl(2,4,6-trimethylbenzoyl)-phosphine oxide, 2-hydroxy methyl propion nitrile, 2,2'-{azobis(2-methyl-N-[1,1'-bis(hydroxy methyl)-2-hydroxyethyl)propion amide], acrylic acid [(2-methoxy-2-phenyl-2-benzoyl)-ethyl]ester, phenyl 2-acryloyloxy-2-propyl ketone, phenyl 2-methacryloyloxy-2-propyl ketone, 4-isopropylphenyl 2-acryloyloxy-2-propyl ketone, 4-chloropheynyl 2-acryloyloxy-2-propyl ketone, 4-dodecylphenyl 2-acryloyloxy-2-propyl ketone, 4-methoxyphenyl 2-acryloyloxy-2-propyl ketone, 4-acryloyloxyphenyl 2-hydroxy-2-propyl ketone, 4-methacryloyloxyphenyl 2-hydroxy-2-propyl ketone, 4-(2-acryloyloxy-ethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethoxy-ethylthio)-phenyl 2-hydroxy-2-propyl ketone, 4-N,N'-bis-(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-methacryloyloxy-2-propyl ketone, 4-(2-acryloyloxyethoxy)-phenyl 2-acryloyloxy-2-propyl ketone, 4-(2-acryloyloxydiethoxy)-phenyl 2-acryloyloxy-2-propyl ketone, dibenzyl ketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acyl phosphine and α-aminoketone. However, aspects of the present disclosure are not limited thereto.

Although not shown in the drawings, the 2-1th curved liquid crystal alignment layer AL2-1C may have a multi-layer structure including a first polyimide alignment layer (not shown) and a second polyimide alignment layer (not shown) in which a greater content of polymerization initiator is introduced to a side chain than that in the first polyimide alignment layer.

For example, the first polyimide alignment layer (not shown) may be a vertical alignment type liquid crystal alignment layer containing polyimides in which the vertical aligner is introduced to a side chain, and the second polyimide alignment layer (not shown) may be a vertical alignment type liquid crystal alignment layer containing polyimides in which both the vertical aligner and the polymerization initiator are introduced to a side chain. The first polyimide alignment layer (not shown) differs from the second polyimide alignment layer (not shown) in that the polymerization initiator is not introduced to a side chain of polyimides.

At least one of the first curved liquid crystal alignment layer AL1C and the second curved liquid crystal alignment layer AL2C may contain an ion scavenger. The ion scavenger may include a cation scavenger or an anion scavenger.

Since liquid crystal molecules may be easily degraded by a direct current voltage and may have dielectric anisotropy in which a dielectric constant of liquid crystal molecules changes according to an alignment direction of the liquid crystal molecules, an alternating current voltage is generally used to drive a liquid crystal display. A charge corresponding to the video signal voltage applied to a source electrode of a thin film transistor is accumulated in a liquid crystal layer and a storage capacitor from the time when a gate pulse voltage is applied. The accumulated charge may need to be sustained until the next frame; however, a certain amount of the accumulated charge may be discharged by a parasitic capacitor generated by an overlap of a gate electrode and a source electrode.

The direct current voltage is offset by the discharged voltage (a kickback voltage and a level shift voltage) and applied to the liquid crystal layer. When the direct current voltage is applied to the liquid crystal layer, impurities in the liquid crystal layer are ionized, and, thus, generated ion impurities are stacked on a liquid crystal alignment layer. The ion impurities may degrade a voltage holding ratio (VHR) and cause an afterimage.

The ion scavenger may scavenge ion impurities in the liquid crystal layer 300C, thereby improving the voltage holding ratio of the curved liquid crystal display 500C. The ion scavenger is not specifically limited, however, the ion scavenger may be, for example, one or more of a carbonyl compound such as alkyl amine, aryl amine, heterocyclic amine, aniline, p-toluidine, p-anisidine, pyrrole, pyrazole, imidazole, indole, pyridine, pyridazine, pyrimidine, quinoline, thiazole, piperidine, pyrrolidine, furan, thiophene, aldeyde, ketone, carboxylic acid, acid halide, ester and amide.

Although not specifically limited, in one exemplary embodiment, the second curved liquid crystal alignment layer AL2C may have a greater content of ion scavenger than that in the first curved liquid crystal alignment layer AL1C. In some exemplary embodiments, an ion scavenger may not be included in the first curved liquid crystal alignment layer AL1C.

A method of fabricating the curved liquid crystal display 500C according to an exemplary embodiment will be described with reference to FIG. 8 through FIG. 13. FIG. 8 through FIG. 13 are cross-sectional views schematically illustrating a method of fabricating the curved liquid crystal display according to an exemplary embodiment.

Figure 8:
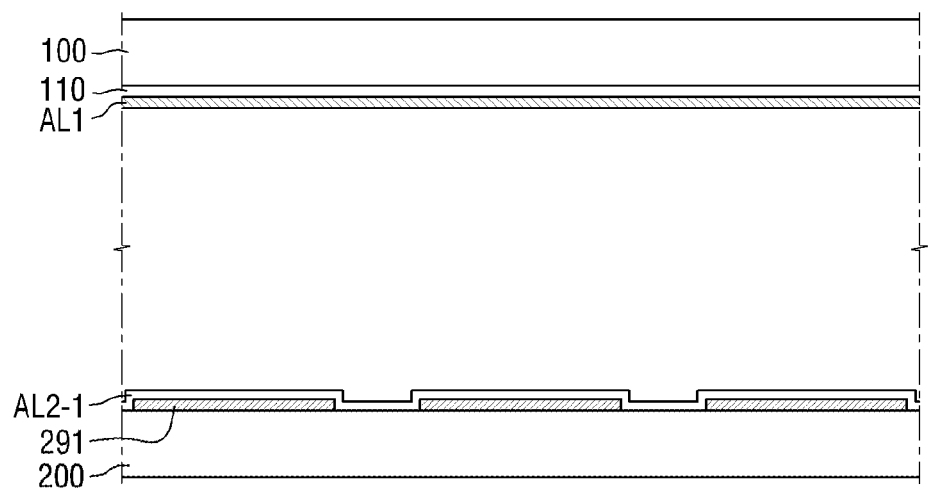
FIG. 8, FIG. 9, FIG. 10, FIG. 11, FIG. 12, and FIG. 13 are cross-sectional views schematically illustrating a method of fabricating the curved liquid crystal display according to an exemplary embodiment.

Referring to FIG. 8, a first flat substrate 100 faces a second flat substrate 200 with a predetermined cell gap maintained therebetween.

A common electrode 110 may be disposed on the first flat substrate 100, and a first flat liquid crystal alignment layer AL1 may be disposed on the common electrode 110. The common electrode 110 may include, or may be made of, indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof or a stacked layer thereof. As described above, the common electrode 110 may be a patternless electrode having no slit pattern.

The first flat liquid crystal alignment layer AU may be formed, for example, through a process of applying first vertical alignment type polyimides in which a vertical aligner is introduced to a side chain, onto the common electrode 110 and drying the applied polyimides. In this case, the first vertical alignment type polyimides may contain an imide group (—CONHCO—) in a repeating unit of a main chain and may have only a vertical aligner in a side chain. However, in some exemplary embodiments, the first vertical alignment type polyimides may contain an ion scavenger introduced to a side chain thereof. The vertical aligner is described above, and, therefore, detailed description thereof will be omitted.

For example, the first vertical alignment type polyimides may contain the polymer compound expressed by the following chemical formula (1). However, aspects of the present disclosure are not limited thereto. In the following chemical formula (1), each of a, b and c is a natural number.

electrode having a slit pattern, and a part of the second flat substrate 200 may be exposed through the slit pattern of the pixel electrode 291.

The 2-1th flat liquid crystal alignment layer AL2-1 may be formed, for example, through a process of applying second vertical alignment type polyimides in which a side chain has a vertical aligner and a polymerization initiator, onto the pixel electrode 291 and drying the applied polyimides. Unlike the first vertical alignment type polyimides, the second vertical alignment type polyimides may contain a polymerization initiator. In some exemplary embodiments, the second vertical alignment type polyimides may contain an ion scavenger. The vertical aligner and the polymerization initiator are described above, and, therefore, detailed description thereof will be omitted.

The 2-1th flat liquid crystal alignment layer AL2-1 may have a multi-layer structure including a first polyimide alignment layer (not shown) and a second polyimide alignment layer (not shown) having a greater content of the polymerization initiator than that in the first polyimide alignment layer (not shown). The first polyimide alignment layer (not shown) may be interposed between the pixel electrode 291 and the second polyimide alignment layer (not shown).

<Chemical formula (1)>

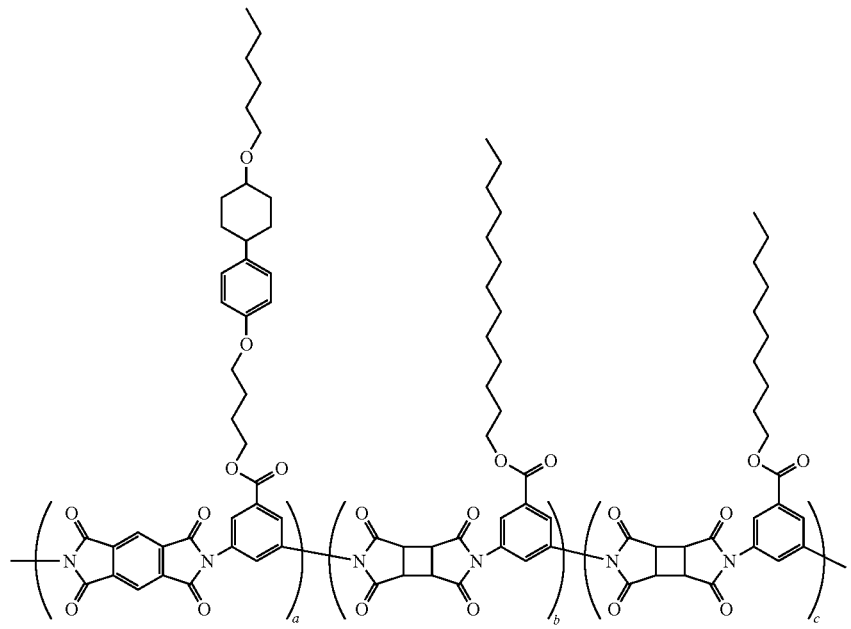

A pixel electrode 291 may be disposed on the second flat substrate 200, and a 2-1th flat liquid crystal alignment layer AL2-1 may be disposed on the pixel electrode 291. The pixel electrode 291 may include, or may be made of, indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof or a stacked layer thereof. As described above, the pixel electrode 291 may be a patterned For example, the first polyimide alignment layer (not shown) may contain the polymer compound expressed by the following chemical formula (2). However, aspects of the present disclosure are not limited thereto. The second polyimide alignment layer (not shown) may contain the polymer compound expressed by the following chemical formula (3). However, aspects of the present disclosure are not limited thereto. In the following chemical formulas (2) and (3), each of a, b and c is a natural number.

<Chemical formula (2)>

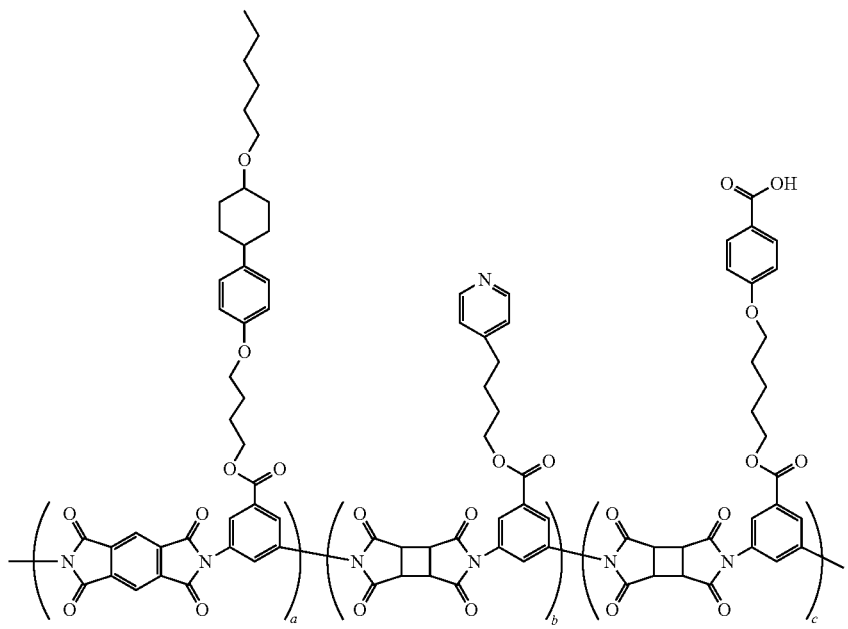

<Chemical formula (3)>

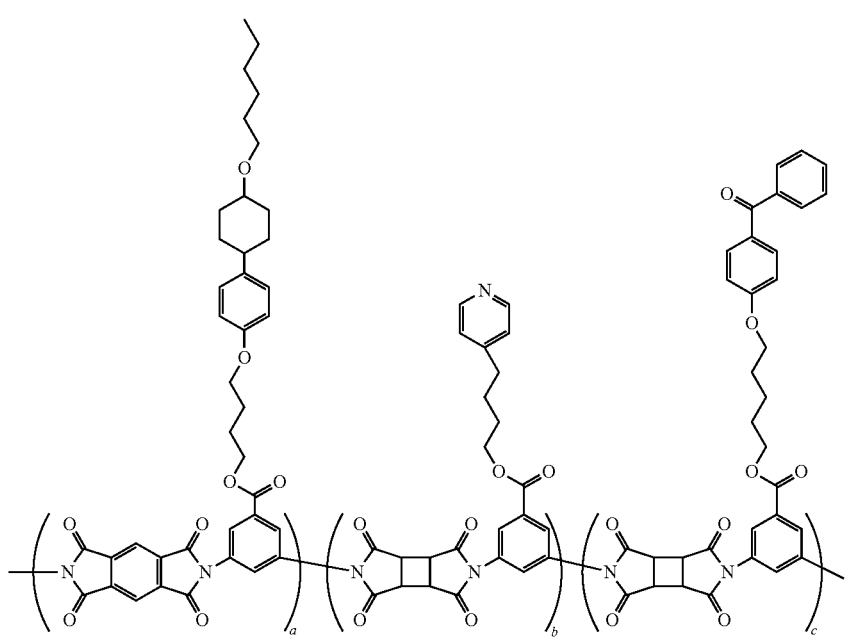

When the polymerization initiator absorbs ultraviolet (UV) light, it may be easily decomposed into a radical and promote a light polymerization reaction of reactive mesogen (RM). For example, when the polymerization initiator absorbs long-wavelength UV light having a wavelength from approximately 300 nm to 400 nm, it may be decomposed into a radical and promote a light polymerization reaction of reactive mesogen.

Figure 9:
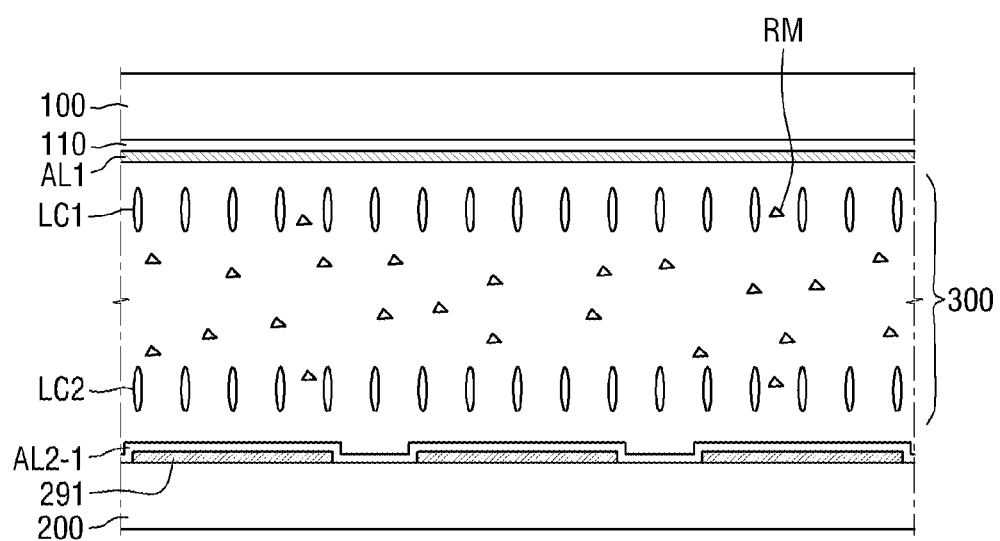

Referring to FIG. 9, a liquid crystal layer 300 is interposed between the first flat substrate 100 and the second flat substrate 200 facing each other. The liquid crystal layer 300 may be formed through a process of injecting or dispensing, between the first flat substrate 100 and the second flat substrate 200, a liquid crystal composition which contains both liquid crystal molecules LC1 and LC2 and reactive mesogen (RM).

Each of the liquid crystal molecules LC1 and LC2 may have negative dielectric anisotropy, but it is not limited thereto. The liquid crystal molecules LC1 and LC2 may be substantially vertically aligned with respect to the first flat substrate 100 and the second flat substrate 200 in an early state where no electric field is applied to a flat panel liquid crystal display 500. More specifically, each aforementioned vertical aligner in the first flat liquid crystal alignment layer AL1 and the 2-1th flat liquid crystal alignment layer AL2-1 may substantially vertically align the liquid crystal molecules LC1 and LC2 with respect to the first flat substrate 100 and the second flat substrate 200 in an early state where no electric field is applied to the flat panel liquid crystal display 500. If the liquid crystal molecules LC1 and LC2 are aligned within the range of 88° to less than 90° with respect to the first flat substrate 100 and the second flat substrate 200, the liquid crystal molecules LC1 and LC2 are substantially vertically aligned with respect to the first flat substrate 100 and the second flat substrate 200. Reactive mesogen can be uniformly dispersed in an early state where no electric field is applied to the flat panel liquid crystal display 500.

Figure 10:
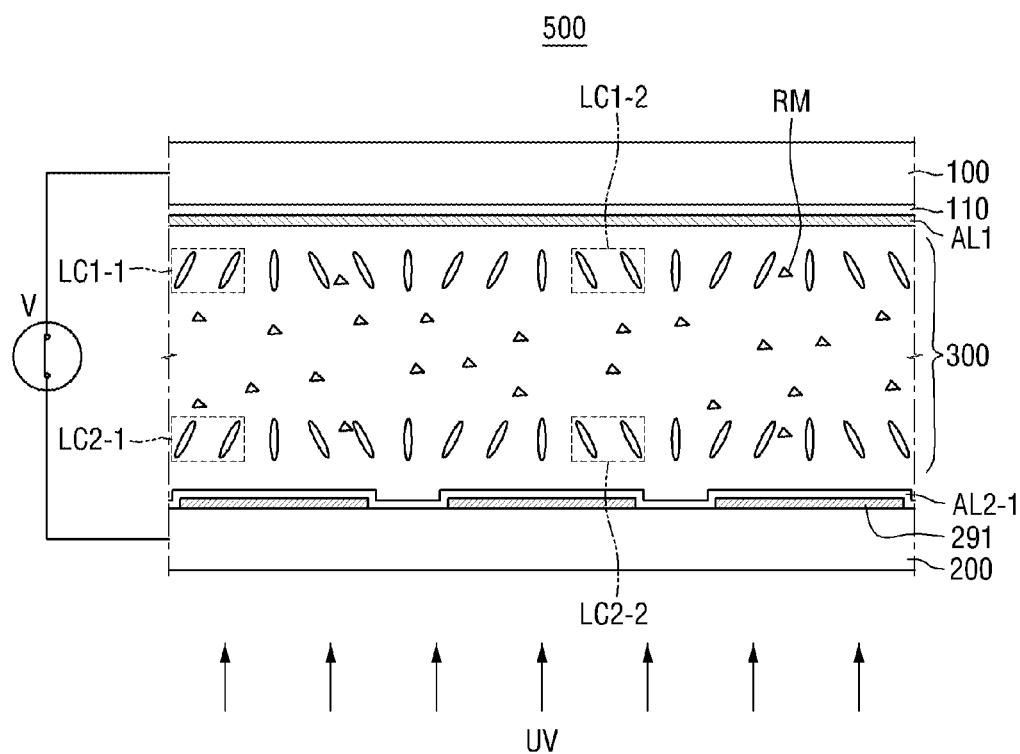

Referring to FIG. 10, the liquid crystal molecules LC1-1, LC1-2, LC2-1, and LC2-2 may be tilt-aligned in the direction vertical to the electric field formed between the common electrode 110 and the pixel electrode 291 when an electric field is applied to the flat panel liquid crystal display 500. A 1-1th liquid crystal molecule LC1-1 and a 2-1th liquid crystal molecule LC2-1 may be aligned in a first tilt direction, and a 1-2th liquid crystal molecule LC1-2 and a 2-2th liquid crystal molecule LC2-2 may be aligned in a second tilt direction. Then, when ultraviolet (UV) light is applied to the flat panel liquid crystal display 500, the polymerization initiator contained in the 2-1th flat liquid crystal alignment layer AL2-1 initiates a light polymerization reaction of reactive mesogen (RM), thereby forming a 2-2th flat liquid crystal alignment layer AL2-2.

Figure 11:
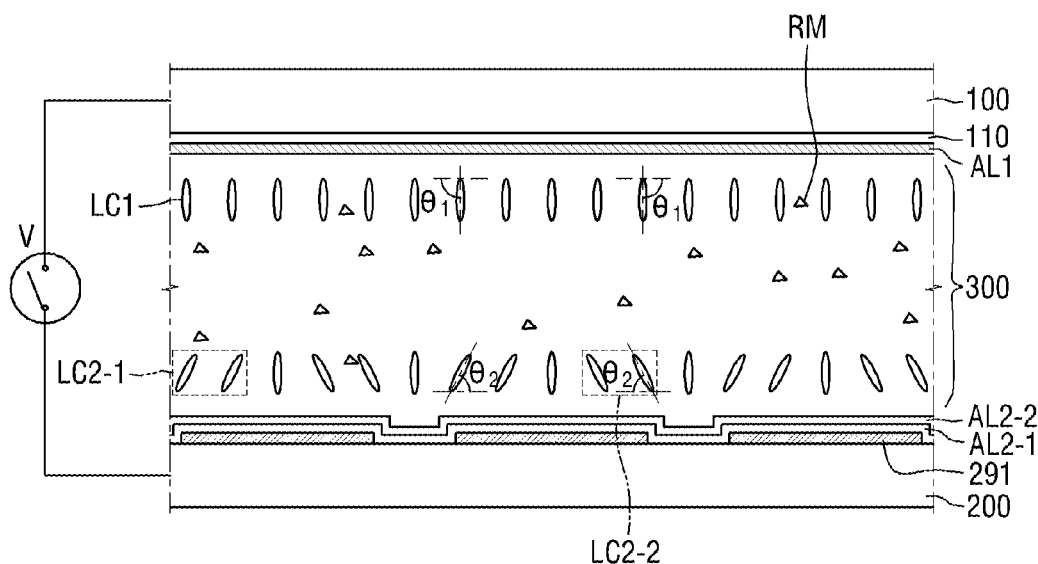

Referring to FIG. 11, reactive mesogen (RM) may shift to the 2-1th flat liquid crystal alignment layer AL2-1 to form the 2-2th flat liquid crystal alignment layer AL2-2. The 2-2th flat liquid crystal alignment layer AL2-2 may be a polymer of reactive mesogen. The 2-2th flat liquid crystal alignment layer AL2-2 may be formed on the 2-1th flat liquid crystal alignment layer AL2-1. As the 2-2th flat liquid crystal alignment layer AL2-2 is formed, a content of reactive mesogen (RM) in the liquid crystal layer 300 gradually decreases. The decreased amount in the reactive mesogen (RM) may be understood as being used in forming the 2-2th flat liquid crystal alignment layer AL2-2.

The 2-2th flat liquid crystal alignment layer AL2-2 may fix or stabilize the alignment direction of the 2-1th liquid crystal molecule LC2-1 and the 2-2th liquid crystal molecule LC2-2. Further, the 2-2th flat liquid crystal alignment layer AL2-2 may reduce the alignment direction change of the 2-1th liquid crystal molecule LC2-1 and the 2-2th liquid crystal molecule LC2-2 when an electric field applied to the liquid crystal layer 300 is changed. Thus, the 2-1th liquid crystal molecule LC2-1 and the 2-2th liquid crystal molecule LC2-2 which are aligned on a surface of the 2-2th flat liquid crystal alignment layer AL2-2 may memorize the alignment direction and maintain the second pre-tilt angle $\theta_2$ even when the electric field applied to the flat panel liquid crystal display 500 is removed. If the electric field applied to the flat panel liquid crystal display 500 is removed, the first liquid crystal molecules LC1 may be substantially vertically realigned like in the early state where no electric field is applied to the flat panel liquid crystal display 500. In this case, the first pre-tilt angle $\theta_1$ of the first liquid crystal molecules LC1 is larger than the second pre-tilt angle $\theta_2$ of the 2-1th and 2-2th liquid crystal molecules LC2-1 and LC2-2. The 2-2th flat liquid crystal alignment layer AL2-2 may include a stabilizer, e.g., reactive mesogens polymerized by polymerization initiator, such as the photo initiator, to fix, stabilize, or reduce a change of an alignment direction of an alignment direction of a liquid crystal molecule, e.g., the 2-1th liquid crystal molecule LC2-1 and the 2-2th liquid crystal molecule LC2-2, located within a distance from the 2-2th flat liquid crystal alignment layer AL2-2 of the second curved liquid crystal alignment layer when an electric field applied to the liquid crystal layer 300 changes.

Figure 12:
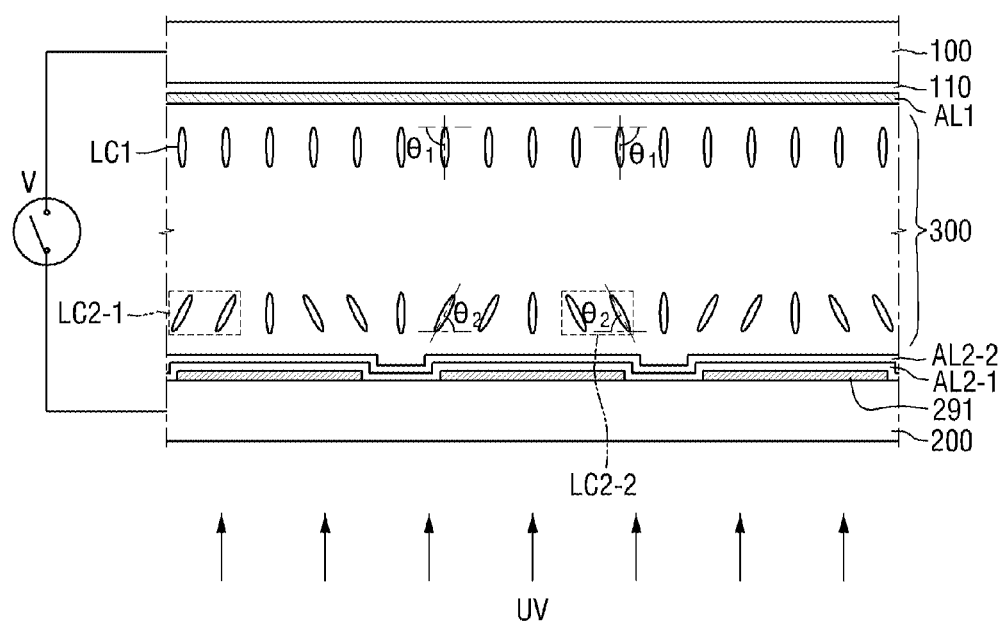
Figure 13:
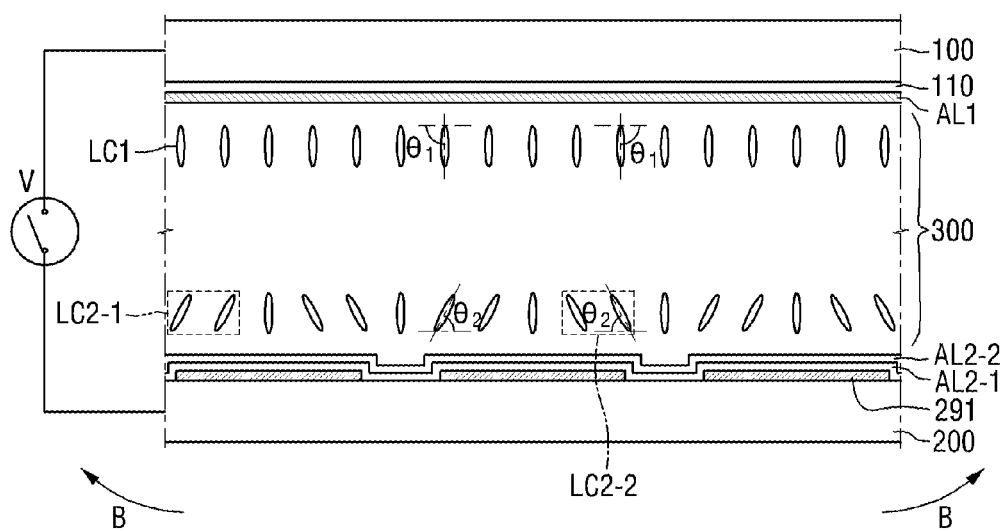

Referring to FIG. 12 and FIG. 13, fluorescent UV light is applied to the flat panel liquid crystal display 500 at the state where no electric field is applied to the flat panel liquid crystal display 500, to thereby remove residual reactive mesogen (RM). Then, a bending process (B) for bending both ends of the flat panel liquid crystal display 500 is performed to fabricate the curved liquid crystal display (500C in FIG. 3).

Referring to FIG. 3, when an electric field applied to the liquid crystal layer 300C is changed, a change of the alignment direction of a liquid crystal molecule, e.g., the second liquid crystal molecules LC2-1 and LC2-2, located within a distance from the second curved liquid crystal alignment layer AL2C is less than a change of an alignment direction of a liquid crystal molecule, e.g., the first liquid crystal molecules LC1, located farther than the distance from the second curved liquid crystal alignment layer AL2C.

The 2-2th curved liquid crystal alignment layer AL2-2C may include at least one of a polymer of a reactive mesogen monomer and a polymerized reactive mesogen. The 2-2th curved liquid crystal alignment layer may include reactive mesogen stabilized by a polymerization initiator to stabilize the alignment direction of the liquid crystal molecule, e.g., the second liquid crystal molecules LC2-1 and LC2-2, located within the distance from the second curved liquid crystal alignment layer AL2C. Referring to FIG. 3 and FIG. 13, when an electric field is not applied to the liquid crystal layer 300C, a pre-tilt angle of the liquid crystal molecule, e.g., the second liquid crystal molecules LC2-1 and LC2-2, located within the distance from the second curved liquid crystal alignment layer AL2C is less than 88°. However, a pre-tilt angle of the liquid crystal molecule, e.g., the first liquid crystal molecules LC1, located farther than the distance from the second curved liquid crystal alignment layer AL2C is substantially vertically aligned.

Figure 14:
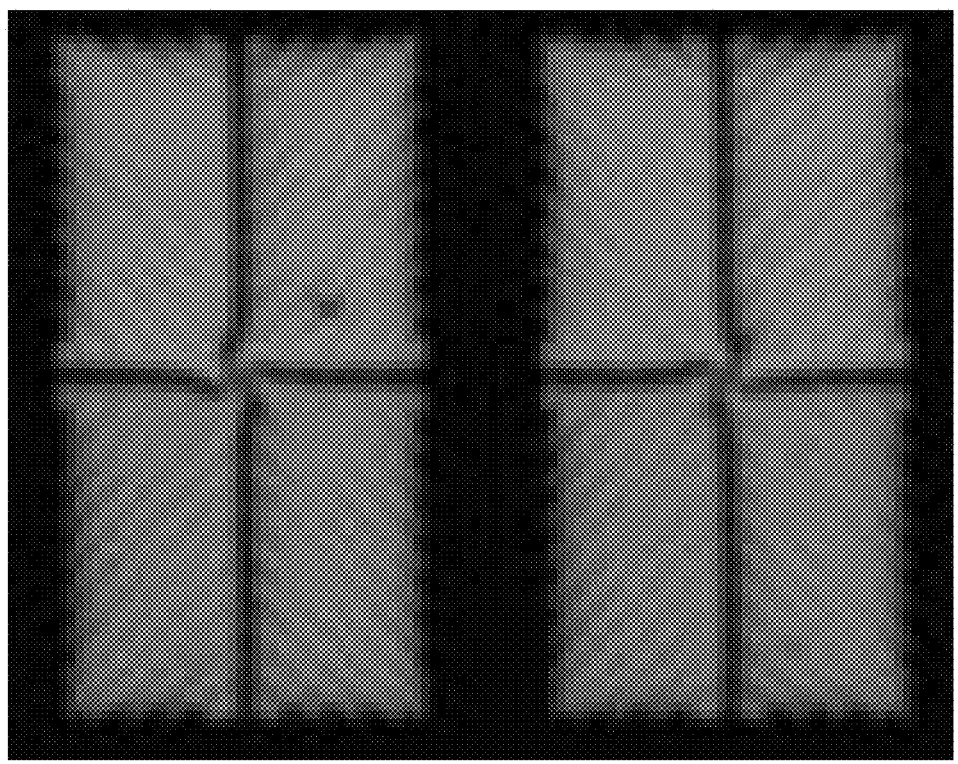
FIG. 14 is an image showing the distribution of light transmittance of the curved liquid crystal display.
Figure 15:
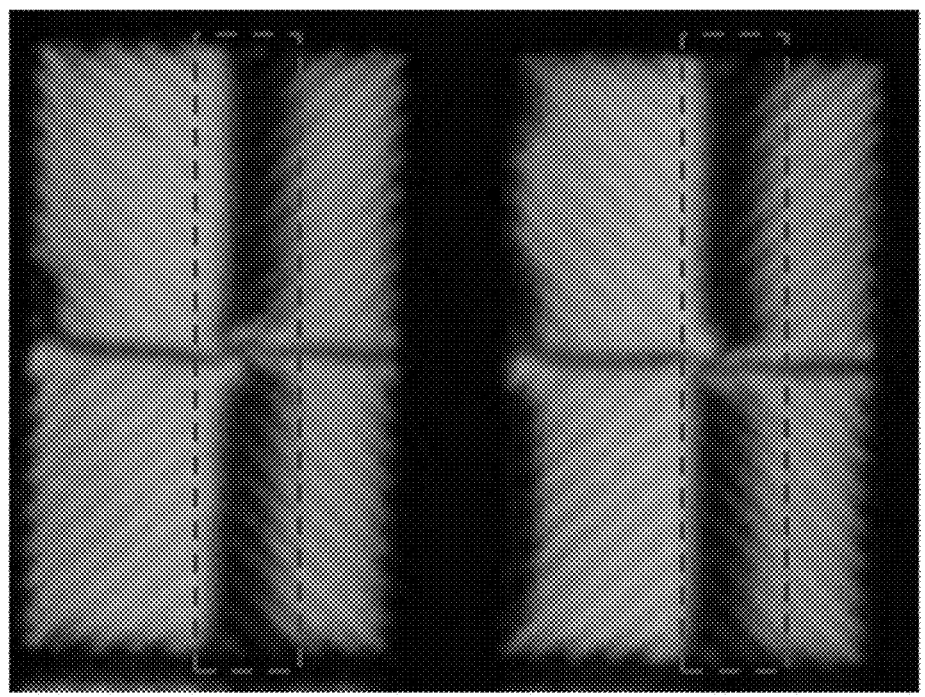
FIG. 15 is an image showing the distribution of light transmittance of a curved liquid crystal display according to a first comparative example.

FIG. 14 is an image showing the distribution of light transmittance of the curved liquid crystal display. FIG. 15 is an image showing the distribution of light transmittance of a curved liquid crystal display according to a first comparative example.

The curved liquid crystal display 500C is fabricated by forming the first flat liquid crystal alignment layer AL1 on the common electrode 110 using the first vertical alignment type polyimides and forming the 2-1th flat liquid crystal alignment layer AL2-1 on the pixel electrode 291 using the second vertical alignment type polyimides according to e.g., the fabrication process illustrated in FIG. 8, and injecting the liquid crystal composition which contains both the reactive mesogen (RM) and liquid crystal molecules LC so as to thereby fabricate the flat panel liquid crystal display 500, and performing the electric field applying process and the bending process according to the fabrication process illustrated in FIG. 9 to FIG. 13.

The curved liquid crystal display according to the first comparative example is fabricated by forming both the first flat liquid crystal alignment layer AL1 and the 2-1th flat liquid crystal alignment layer AL2-1 using the second vertical alignment type polyimides, which is similar to the fabrication process illustrated in FIG. 8, and injecting the liquid crystal composition which contains both the reactive mesogen (RM) and liquid crystal molecules LC so as to thereby fabricate a flat panel liquid crystal display, and performing the electric field applying process and the bending process (B), which is similar to the fabrication process illustrated in FIG. 9 to FIG. 13.

Referring to FIG. 14 and FIG. 15, unlike the curved liquid crystal display 500C shown in FIG. 14, a texture generated by a collision between the alignment direction of the first liquid crystal molecules and the alignment direction of the second liquid crystal molecules is seen as a dark portion (marked as a dotted line in FIG. 15) in the curved liquid crystal display according to the first comparative example.

Figure 16:
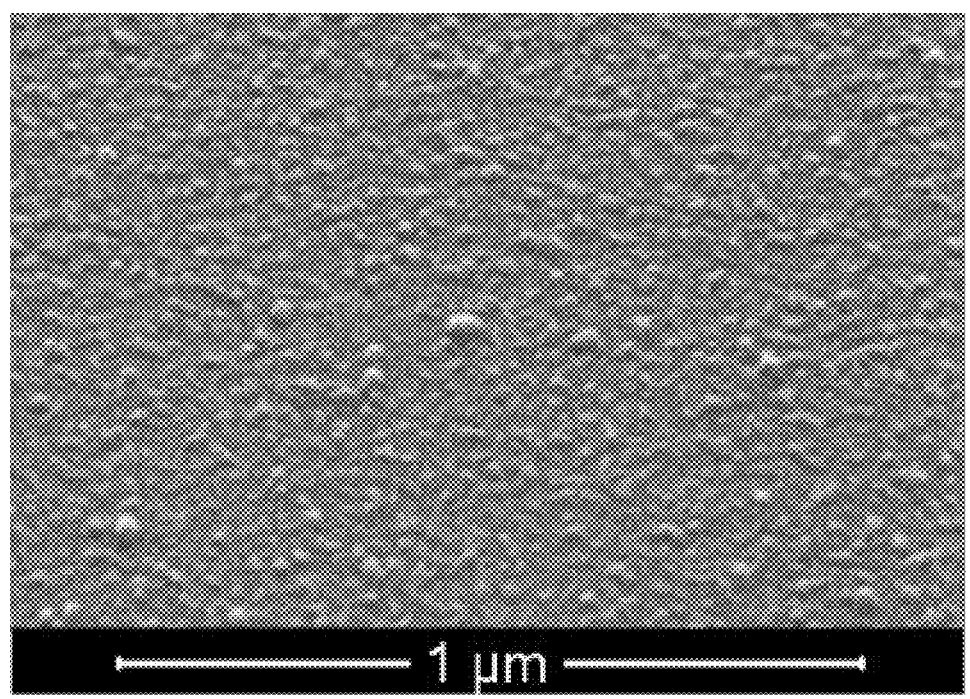
FIG. 16 is an image showing a surface of the first curved liquid crystal alignment layer of the curved liquid crystal display according to the first comparative example.
Figure 17:
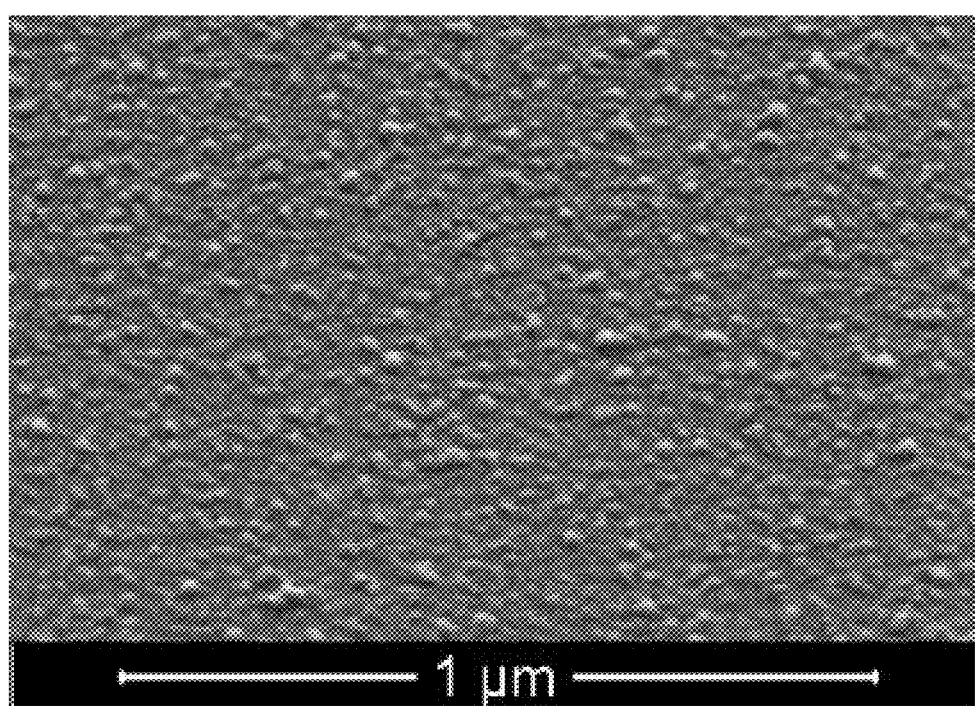
FIG. 17 is an image showing a surface of the second curved liquid crystal alignment layer of the curved liquid crystal display according to the first comparative example.

FIG. 16 is an image showing a surface of the first curved liquid crystal alignment layer of the curved liquid crystal display according to the first comparative example, and FIG. 17 is an image showing a surface of the second curved liquid crystal alignment layer of the curved liquid crystal display according to the first comparative example. Referring to FIG. 16 and FIG. 17, the number of protrusions per unit area in the first curved liquid crystal alignment layer and the second curved liquid crystal alignment layer are substantially the same. Unlike the structures shown in FIG. 16 and FIG. 17, referring to FIG. 4 and FIG. 5, the average number of protrusions per unit area in the second curved liquid crystal alignment layer AL2C is relatively larger than the average number of protrusions per unit area in the first curved liquid crystal alignment layer AL1C in the configuration of the curved liquid crystal display 500C.

Figure 18:
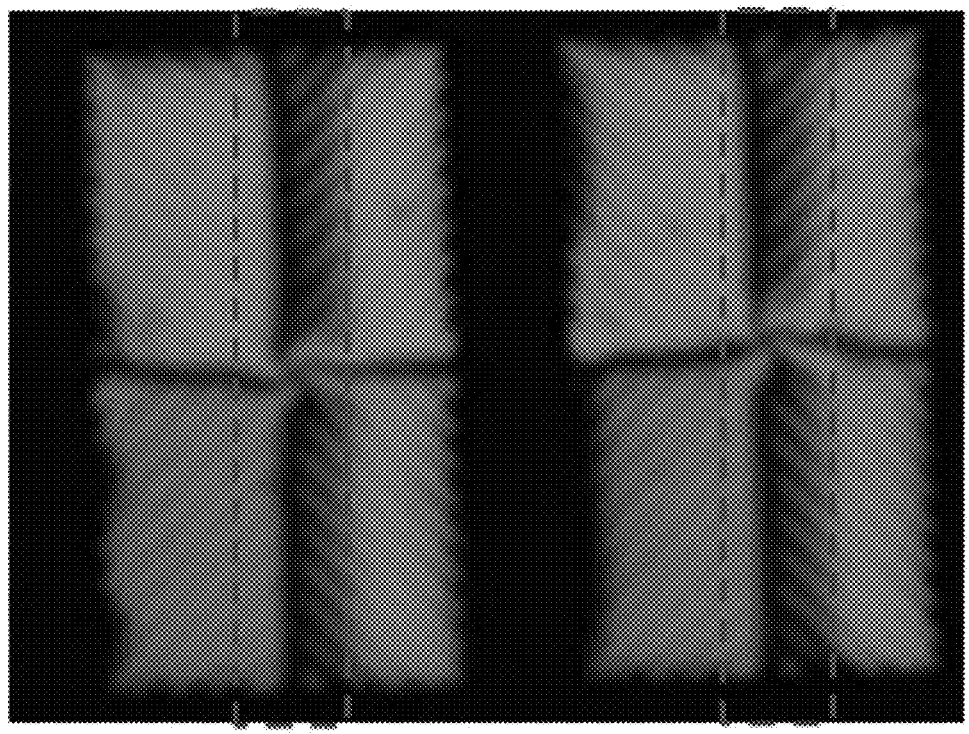
FIG. 18 is an image showing the distribution of light transmittance of a curved liquid crystal display according to a second comparative example.

FIG. 18 is an image showing the distribution of light transmittance of a curved liquid crystal display according to a second comparative example. The curved liquid crystal display according to the second comparative example is fabricated by forming both the first flat liquid crystal alignment layer AL1 and the 2-1th flat liquid crystal alignment layer AL2-1 using the first vertical alignment type polyimides, which is similar to the fabrication process illustrated in FIG. 8, and injecting the liquid crystal composition which contains both the reactive mesogen (RM) and liquid crystal molecules LC so as to thereby fabricate a flat panel liquid crystal display, and performing the electric field applying process and the bending process (B), which is similar to the fabrication process illustrated in FIG. 9 to FIG. 13.

Referring to FIG. 18, a texture generated by a collision between the alignment direction of the first liquid crystal molecules and the alignment direction of the second liquid crystal molecules is seen as a dark portion (marked as a dotted line) in the curved liquid crystal display according to the second comparative example.

Figure 19:
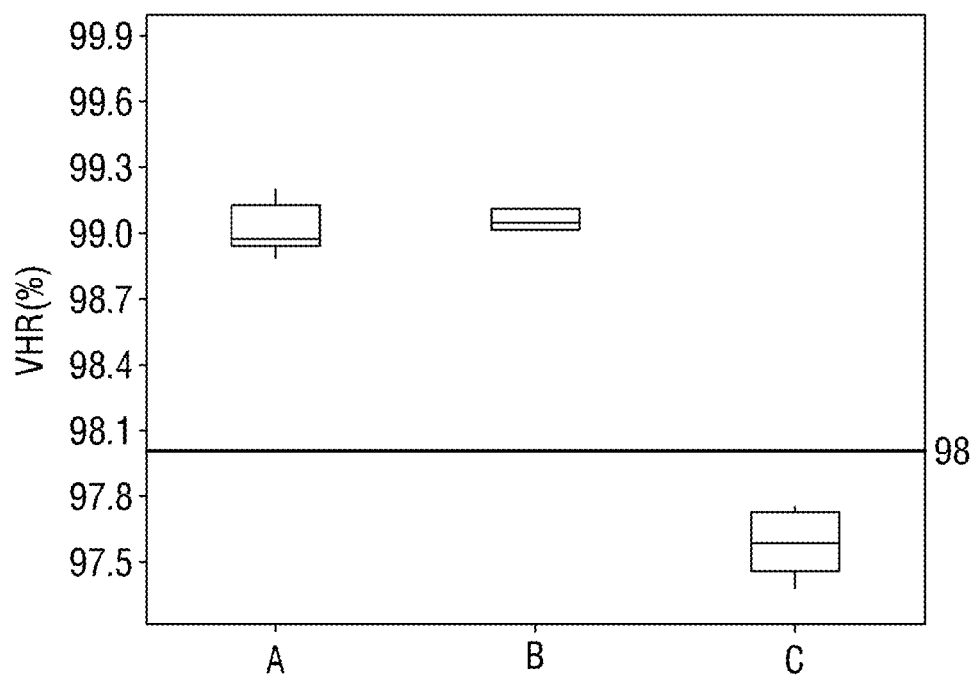
FIG. 19 illustrates the voltage holding ratio (VHR) measured by the curved liquid crystal display of FIG. 3
Figure 20:
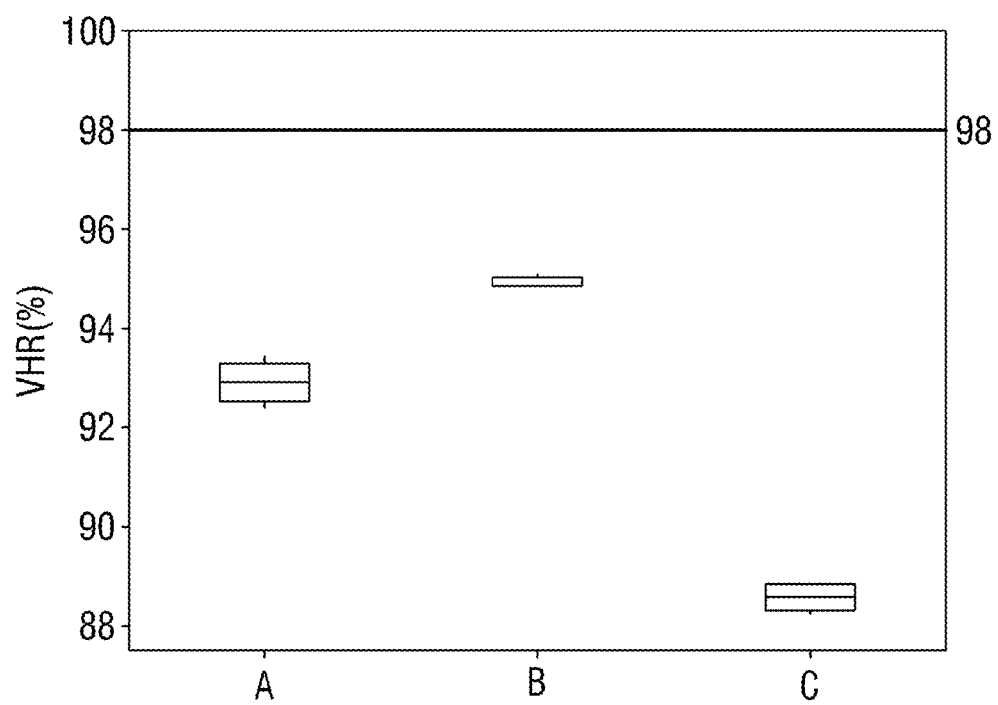
FIG. 20 illustrates the voltage holding ratio (VHR) measured by a curved liquid crystal display according to a third comparative example.

FIG. 19 illustrates the voltage holding ratio (VHR) measured by the curved liquid crystal display of FIG. 3. FIG. 20 illustrates the voltage holding ratio (VHR) measured by a curved liquid crystal display according to a third comparative example. Referring to FIG. 19 and FIG. 20, A denotes the voltage holding ratio before exposure to UV light, B denotes the voltage holding ratio after exposure to UV light, and C denotes the voltage holding ratio after exposure to fluorescent UV light.

Referring to FIG. 19 and FIG. 20, the voltage holding ratio in the curved liquid crystal display 500C which contains an ion scavenger is improved as compared with the voltage holding ratio in the curved liquid crystal display of the third comparative example which contains no ion scavenger.

The curved liquid crystal display 500C according to an exemplary embodiment is fabricated by forming the first flat liquid crystal alignment layer AL1 on the common electrode 110 using the first vertical alignment type polyimides and forming the 2-1th flat liquid crystal alignment layer AL2-1 on the pixel electrode 291 using the second vertical alignment type polyimides in which pyridine serving as an ion scavenger is introduced to a side chain according to the fabrication process illustrated in FIG. 8, and injecting the liquid crystal composition which contains both the reactive mesogen (RM) and liquid crystal molecules LC so as to thereby fabricate the flat panel liquid crystal display 500C, and performing the electric field applying process and the bending process according to the fabrication process illustrated in FIG. 9 to FIG. 13.

The curved liquid crystal display according to the third comparative example is fabricated by the following processes. Both the first flat liquid crystal alignment layer AL1 and the 2-1th flat liquid crystal alignment layer AL2-1 are formed using the first vertical alignment type polyimides using a process similar to the fabrication process illustrated in FIG. 8. In this case, an ion scavenger is not introduced to a side chain of the first vertical alignment type polyimides. Then, the liquid crystal composition which contains both the reactive mesogen (RM) and liquid crystal molecules LC is injected so as to thereby fabricate a flat panel liquid crystal display, and the electric field applying process and the bending process (B) are performed a process similar to the fabrication process illustrated in FIG. 9 to FIG. 13, to thereby fabricate the curved liquid crystal display according to the third comparative example.

Tables 1 and 2 show the result of the measurement of the voltage holding ratio of the curved liquid crystal display 500C according to an exemplary embodiment and the curved liquid crystal display according to the third comparative example.

TABLE 1

| Unit: % | Exemplary embodiment (preferred) | | |
|---|---|---|---|
| | Before exposure to light (A) | After exposure to light (B) | After exposure to fluorescent UV light (C) |
| Minimum value | 98.9 | 99.0 | 97.4 |
| Maximum value | 99.2 | 99.1 | 97.8 |
| Average value | 99.0 | 99.1 | 97.6 |
| Standard deviation | 0.11 | 0.04 | 0.14 |
| Number of samples (S/S) | 8 | 8 | 8 |

TABLE 2

| Unit: % | Third comparative example | | |
|---|---|---|---|
| | Before exposure to light (A) | After exposure to light (B) | After exposure to fluorescent UV light (C) |
| Minimum value | 92.4 | 94.4 | 88.2 |
| Maximum value | 93.5 | 95.1 | 88.8 |
| Average value | 92.9 | 94.9 | 88.5 |
| Standard deviation | 0.39 | 0.22 | 0.25 |
| Number of samples (S/S) | 8 | 8 | 8 |

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A curved liquid crystal display comprising:
a first curved substrate;
a second curved substrate;
a liquid crystal layer comprising liquid crystal molecules having negative dielectric anisotropy, the liquid crystal layer being interposed between the first curved substrate and the second curved substrate;

a first curved liquid crystal alignment layer interposed between the liquid crystal layer and the first curved substrate; and a second curved liquid crystal alignment layer interposed between the liquid crystal layer and the second curved substrate, wherein:

the first curved liquid crystal alignment layer comprises protrusions protruded toward the second curved liquid crystal alignment layer;

the second curved liquid crystal alignment layer comprises protrusions protruded toward the first curved liquid crystal alignment layer;

an average number of the protrusions on the second curved liquid crystal alignment layer is greater than an average number of the protrusions on the first curved liquid crystal alignment layer; and the protrusions are arranged in an irregular island pattern on the first curved liquid crystal alignment layer and the second curved liquid crystal alignment layer.

2. The curved liquid crystal display of claim 1, further comprising:

a patternless electrode interposed between the first curved substrate and the first curved liquid crystal alignment layer; and a patterned electrode interposed between the second curved liquid crystal alignment layer and the second curved substrate, the patterned electrode comprising a slit pattern.

3. The curved liquid crystal display of claim 1, wherein the liquid crystal molecules having negative dielectric anisotropy comprise a first liquid crystal molecule and a second liquid crystal molecule having a pre-tilt angle smaller than a pre-tilt angle of the first liquid crystal molecule.

4. The curved liquid crystal display of claim 3, wherein a difference ($m\theta_1 - m\theta_2$) between an average value ($m\theta_1$) of the pre-tilt angle ($\theta_1$) of the first liquid crystal molecule and an average value ($m\theta_2$) of the pre-tilt angle ($\theta_2$) of the second liquid crystal molecule ranges from 0.5° to 1.5°.

5. The curved liquid crystal display of claim 4, wherein the curved liquid crystal display has a radius of curvature (R) ranging from 2,000 mm to 5,000 mm.

6. The curved liquid crystal display of claim 1, wherein an average value of surface roughness values of the second curved liquid crystal alignment layer is greater than an average value of surface roughness values of the first curved liquid crystal alignment layer.

7. The curved liquid crystal display of claim 1, wherein a content of polymerized reactive mesogen in the second curved liquid crystal alignment layer is greater than a content of polymerized reactive mesogen in the first curved liquid crystal alignment layer.

8. The curved liquid crystal display of claim 1, wherein the second curved liquid crystal alignment layer comprises a 2-1th curved liquid crystal alignment layer and a 2-2th curved liquid crystal alignment layer, wherein a content of imide group (—CONHCO—) in the 2-1th curved liquid crystal alignment layer is greater than a content of imide group (—CONHCO—) in the 2-2th curved liquid crystal alignment layer, and wherein a content of polymerized reactive mesogen in the 2-2th curved liquid crystal alignment layer is greater than a content of polymerized reactive mesogen in the 2-1th curved liquid crystal alignment layer.

9. The curved liquid crystal display of claim 8, wherein the 2-1th curved liquid crystal alignment layer comprises a first polyimide alignment layer and a second polyimide alignment layer, and wherein a content of polymerization initiator introduced to a side chain in the second polyimide alignment layer is greater than a content of polymerization initiator in the first polyimide alignment layer.

10. The curved liquid crystal display of claim 1, wherein the island pattern comprises at least two protrusions that are spaced apart from each other with a predetermined distance therebetween.

* * * * *